United States Patent [19]

Sugitani et al.

[11] Patent Number: 4,851,639
[45] Date of Patent: Jul. 25, 1989

[54] APPARATUS FOR AUTOMATICALLY WELDING CYLINDRICAL VESSEL

[75] Inventors: Yuji Sugitani; Yasuhiko Nishi; Yoshihiro Kanjo, all of Tokyo, Japan

[73] Assignees: NKK Corporation; Nippon Sanso K.K., both of Tokyo, Japan

[21] Appl. No.: 251,544

[22] Filed: Sep. 29, 1988

[51] Int. Cl.⁴ .............................................. B23K 9/12
[52] U.S. Cl. ............................. 219/124.34; 219/125.11
[58] Field of Search ............ 219/124.34, 125.1, 125.11

[56] References Cited

U.S. PATENT DOCUMENTS

| | | | |
|---|---|---|---|
| 3,627,973 | 12/1971 | Smith | 219/125.1 |
| 4,233,491 | 11/1980 | Maruyama et al. | 219/125.1 |
| 4,698,484 | 10/1987 | Babcock et al. | 219/124.34 |

Primary Examiner—Clifford C. Shaw
Attorney, Agent, or Firm—Frishauf, Holtz, Goodman & Woodward

[57] ABSTRACT

An apparatus for automatically welding a cylindrical vessel, which comprises: a rotating means (8) for rotating a cylindrical vessel to be welded around the center axis thereof; a travelling carriage (1); a manipulator (2) mounted on the carriage (1), said manipulator comprising a vertical post (10) secured onto the carriage (1), a horizontal column (11) movable horizontally and vertically along the vertical post (10), and an expansion arm (12) fitted rotatably to the leading end of the horizontal column (11); a welding head (4) fitted through an L-shaped fitting member (3) to the tip of the arm (12), said welding head comprising a welding nozzle (16), a groove profiling means (17) and a groove shooting means (20); a welding wire feeder (5) mounted on the carriage (1); a welding electric power source (6) mounted on the carriage (1); and a welding controller (9) mounted on the carriage (1), said welding controller comprising an image processor (32), a welding current controller (33), a welding wire feed controller (34), a welding speed controller (35), and a groove profiling controller (36).

1 Claim, 4 Drawing Sheets

APPARATUS FOR AUTOMATICALLY WELDING CYLINDRICAL VESSEL

FIELD OF THE INVENTION

The present invention relates to an apparatus for automatically welding a tack-welded cylindrical vessel along an outer surface groove and an inner surface groove formed thereon.

BACKGROUND OF THE INVENTION

For welding a tack-welded cylindrical vessel such as a pressure vessel along an outer surface groove and an inner surface groove formed thereon, it is the conventional practice to use manual welding or to assemble a self-travelling welding machine in the cylindrical vessel for welding.

However, a manual welding has a low efficiency, and when welding a cylindrical vessel along an inner surface groove formed thereon, inconvenience is inevitable that welding cannot be accomplished unless the operator enters the narrow space within the cylindrical vessel. On the other hand, since a self-travelling welding machine gives an unstable travel, it is impossible to conduct high-speed welding.

Under such circumstances, there is a demand for development of an apparatus for automatically welding a tack-welded cylindrical vessel at a high efficiency along an outer surface groove and an inner surface groove formed thereon, but such a welding apparatus has not as yet been proposed.

SUMMARY OF THE INVENTION

An object of the present invention is therefore to provide an apparatus for automatically welding a tack-welded cylindrical vessel at a high efficiency along an outer surface groove and an inner surface groove formed thereon.

In accordance with one of the features of the present invention, there is provided an apparatus for automatically welding a cylindrical vessel, comprising:

a rotating means (8) for rotating a cylindrical vessel to be welded, placed horizontally thereon, around the center axis of said cylindrical vessel;

a travelling carriage (1);

a manipulator (2) mounted on said carriage (1), said manipulator comprising a post (10) vertically secured onto said carriage (1), a column (11) horizontally fitted to said vertical post (10), said horizontal column being horizontally movable relative to said vertical post (10) and vertically movable along said vertical post (10), and an expansion arm (12) fitted rotatably within a vertical plane to the leading end of said horizontal column (11);

an L-shaped fitting member (3) fitted rotatably around the center axis of said expansion arm (12) to the tip of said arm (12);

a welding head (4) fitted to said L-shaped fitting member (3), said welding head comprising a welding nozzle (16), the center axis of which runs along the extension of the center axis of said expansion arm (12), for guiding a welding wire (15) toward a groove formed on said cylindrical vessel to be welded, a groove profiling means (17) which comprises a horizontal profiling mechanism (18) for moving said welding nozzle (16) in the width direction of said groove and a vertical profiling mechanism (19) for moving said welding nozzle (16) in the depth direction of said groove, and a groove shooting means (20) which comprises a TV camera (21) for shooting a portion of said groove in the downstream of the travelling direction of said welding nozzle (16) and a light source (22) for illuminating said portion of said groove to be shot by said TV camera (21), whereby said welding head (4) is rotatable around the center axis of said welding nozzle (16) along with rotation of said L-shaped fitting member (3);

a welding wire feeder (5), mounted on said carriage (1), for continuously feeding said welding wire (15) through said welding nozzle (16) toward said groove;

a welding electric power source (6), mounted on said carriage (1), for supplying a welding current to said welding wire (15) to produce an arc between the tip of said welding wire (15) and said groove; and a welding controller (9) mounted on said carriage (1), said welding controller comprising an image processor (32) for converting an image signal from said grove shooting means (20) into a groove shape signal, a welding current controller (33) for controlling said welding electric power source (6) in response to said groove shape signal from said image processor (32) so as to maintain said welding current at an appropriate value, a welding wire feed controller (34) for controlling said welding wire feeder (5) in response to said welding current from said welding electric power source (6) so as to maintain the feeding rate of said welding wire (15) at an appropriate value, a welding speed controller (35) for controlling any one of the rotating speed of said rotating means (8) and the horizontal moving speed of said horizontal column (11) in response to the feeding rate of said welding wire (15) so as to maintain the welding speed at an appropriate value, and a groove profiling controller (36) for controlling said groove profiling means (17) on the basis of said welding current from said welding electric power source (6) so as to cause the center axis of said welding nozzle (16) to run along the center line of said groove and to maintain the distance between the tip of said welding wire (15) and said groove at an appropriate value.

DETAILED DESCRIPTION OF PREFERRED EMBODIMENTS

From the above-mentioned point of view, extensive studies were carried out to develop an apparatus for automatically welding a cylindrical vessel at a high efficiency along an outer surface groove and an inner surface groove formed thereon. As a result, there was obtained the finding that it is possible to automatically weld a cylindrical vessel at a high efficiency along an outer surface groove and an inner surface groove formed on the cylindrical vessel in the axial and circumferential directions thereof, by horizontally placing the cylindrical vessel to be welded on a rotating means, rotatably fitting a welding head, which comprises a welding nozzle, a groove shooting means and a groove profiling means, to the leading end of a horizontally movable column, and controlling the rotating means, the horizontal column and the welding head by means of a welding controller.

The present invention was made on the basis of the above-mentioned finding. Now, the apparatus for automatically welding a cylindrical vessel of time present invention is described in detail with reference to drawings.

Figure 1:
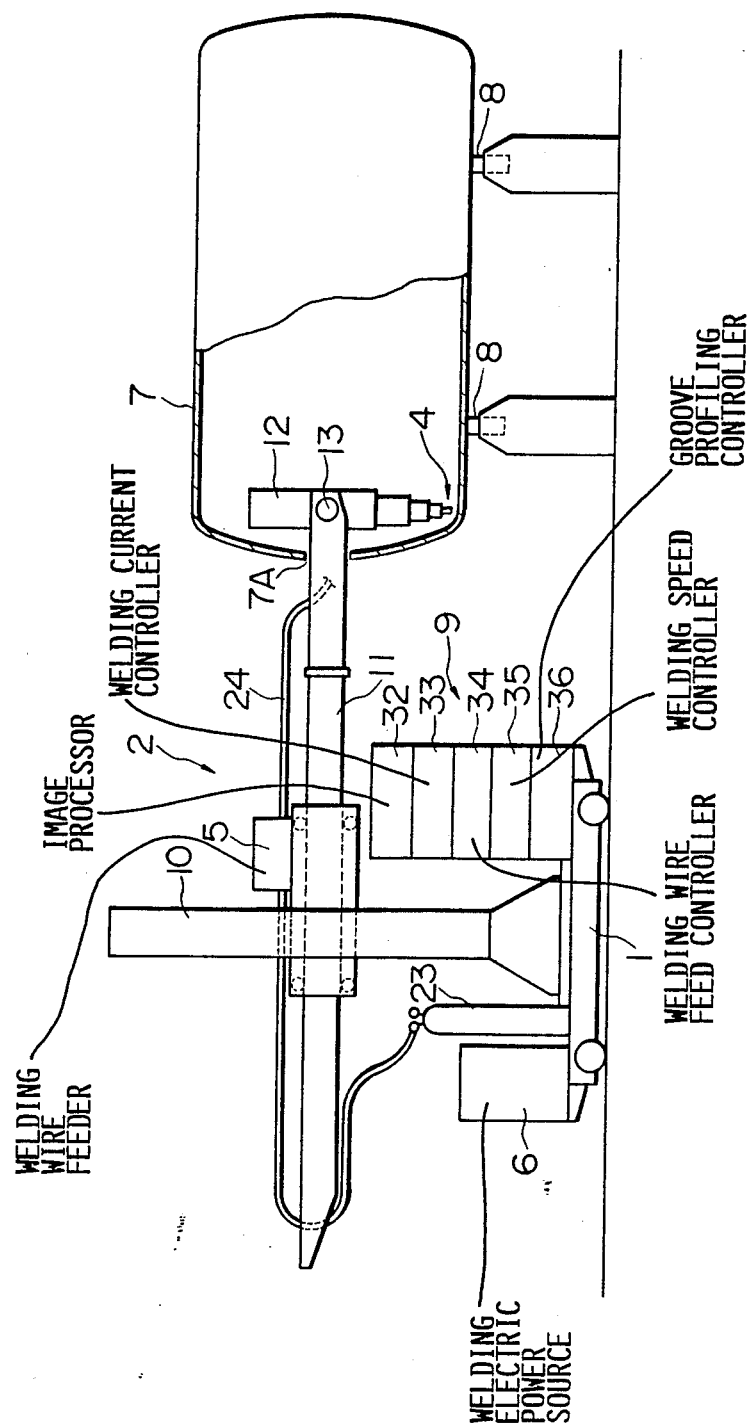
FIG. 1 is a front view illustrating an embodiment of the apparatus for automatically welding a cylindrical vessel of the present invention.
Figure 2:
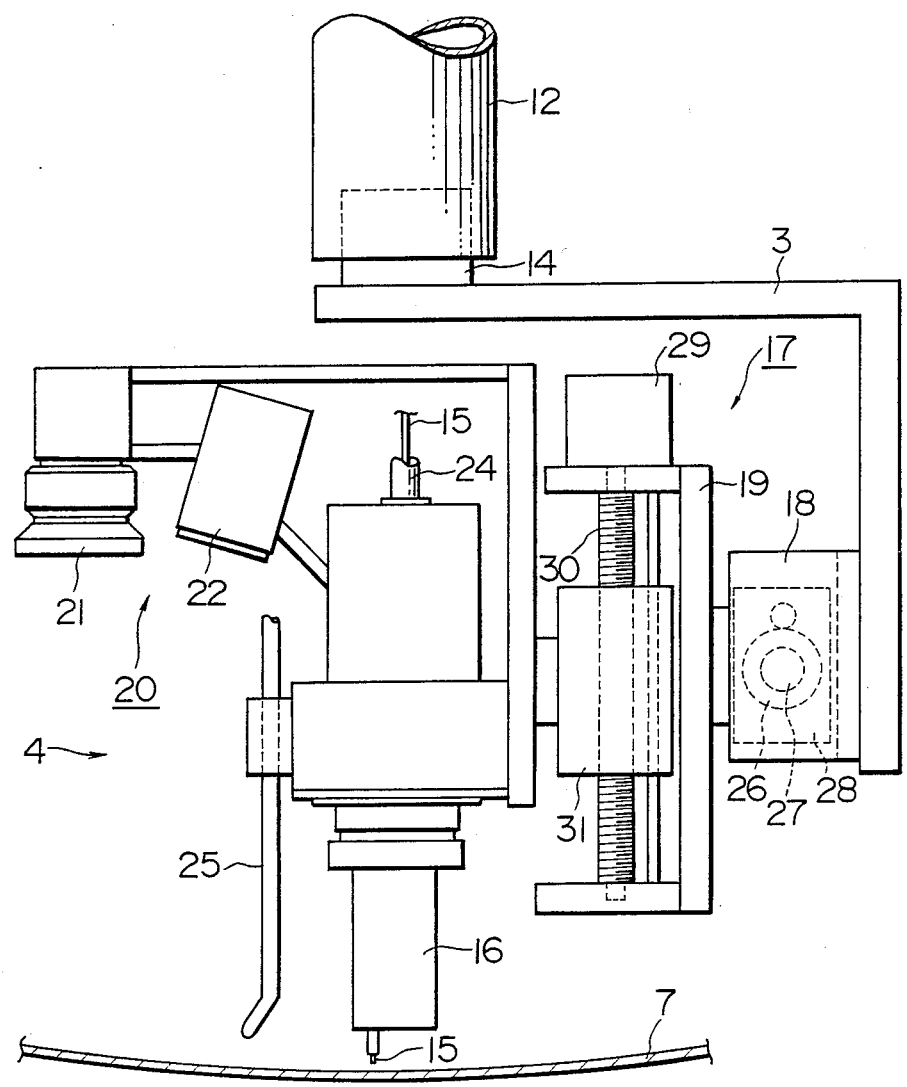
FIG. 2 is a side view illustrating a welding head in the apparatus for automatically welding a cylindrical vessel of the present invention.

FIG. 1 is a front view illustrating an embodiment of the apparatus for automatically welding a cylindrical vessel of the present invention; and FIG. 2 is a side view illustrating a welding head in the apparatus for automatically welding a cylindrical vessel of the present invention.

As shown in FIGS. 1 and 2, the apparatus for automatically welding a cylindrical vessel of the present invention comprises a rotating means 8 comprising rollers and the like for rotating a cylindrical vessel 7 to be welded which is placed horizontally thereon, around the center axis of the cylindrical vessel 7, a travelling carriage 1, a manipulator 2 mounted on the carriage 1, an L-shaped fitting member 3 fitted to the leading end of the manipulator 2, a welding head 4 fitted to the L-shaped fitting member 3, a welding wire feeder 5, mounted on the carriage 1, for continuously feeding a welding wire 15 through a welding nozzle described later of the welding head 4 toward a groove (not shown) formed on the cylindrical vessel 7, a welding electric power source 6, mounted on the carriage 5, for supplying a welding current to the welding wire 15 to produce an arc between the tip of the welding wire 15 and the groove, and a welding controller 9 mounted on the carriage 1.

Figure 3:
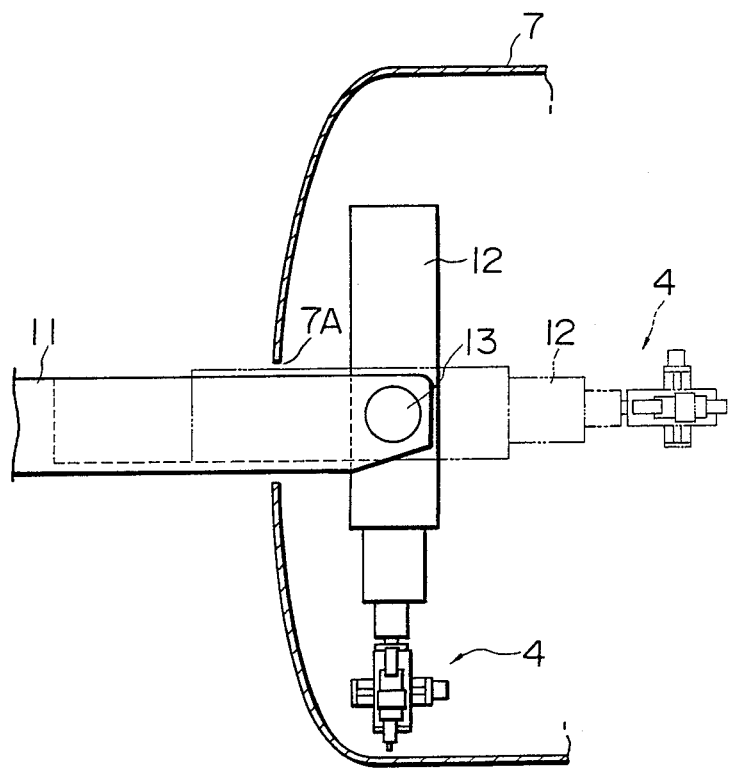
FIG. 3 is a front view illustrating an expansion arm fitted with the welding head in the apparatus for automatically welding a cylindrical vessel of the present invention.

The manipulator 2 comprises a post 10 vertically secured onto the carriage 1, a column 11 horizontally fitted to the vertical post 10 and an expansion arm 12 fitted rotatably within a vertical plane around a horizontal axle 13 as shown in FIGS. 1 and 3 to the leading end of the horizontal column 11.

Figure 4:
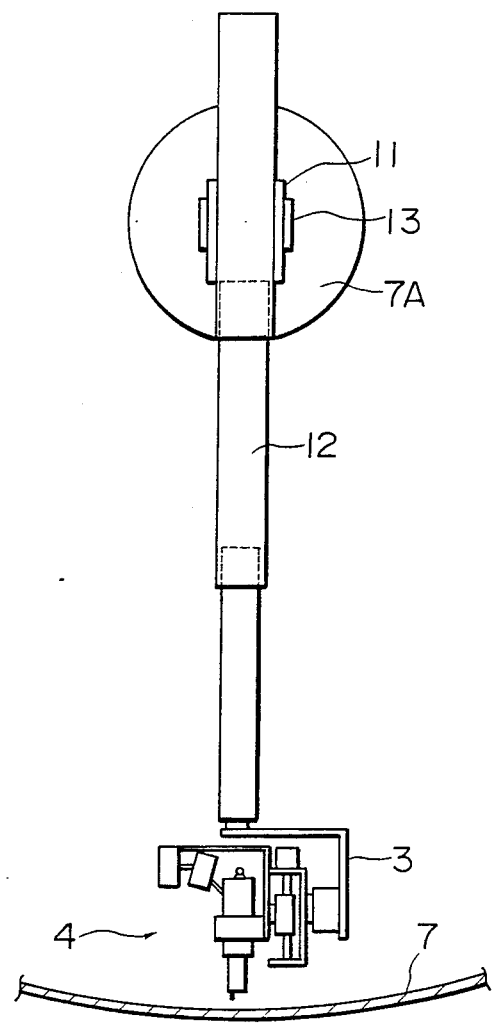
FIG. 4 is a side view illustrating the expansion arm fitted with the welding head in the apparatus for automatically welding a cylindrical vessel of the present invention.

The horizontal column 11 is horizontally movable by means, for example, of a rack and pinion mechanism (not shown) relative to the vertical post 10, and is also vertically movable by means, for example, of a rack and pinion mechanism (not shown) along the vertical post 10. When welding the cylindrical vessel 7 along an inner surface groove (not shown) formed thereon, the horizontal column 11 is inserted together with the expansion arm 12 rotated to the horizontal position as shown in FIG. 3, into the cylindrical vessel 7 to be welded through an opening 7A which is provisionally provided on one end of the cylindrical vessel 7 and is to be closed after the completion of welding. The expansion arm 12 comprises, for example, a hydraulic cylinder, and is expandable in match with the inside diameter of the cylindrical vessel 7 as shown in FIG. 4.

The L-shaped fitting member 3 is fitted rotatably around the center axis of the expansion arm 12 of the manipulator 2 by the action of a first motor 14, to the tip of the expansion arm 12. The welding head 4 comprises a welding nozzle 16, the center axis of which runs along the extension of the center axis of the expansion arm 12, for guiding the welding wire 15 toward the groove (not shown) formed on the cylindrical vessel 7 to be welded, a groove profiling means 17 which comprises a horizontal profiling mechanism 18 for moving the welding nozzle 16 in the width direction of the groove and a vertical profiling mechanism 19 for moving the welding nozzle 16 in the depth direction of the groove, and a groove shooting means 20 which comprises a TV camera 21 for shooting a portion of the groove in the downstream of the travelling direction of the welding nozzle 16 and a light source 22 for illuminating the portion of the groove to be shot by the TV camera 21. The welding head 4 is rotatable around the center axis of the welding nozzle 16 along with rotation of the L-shaped fitting member 3.

The welding nozzle 16 is, for example, a nozzle for rotary arc-welding, and rotatable around the center axis thereof at a prescribed rotating speed. The welding wire 15 is substantially vertically fed from the welding wire feeder 5 through the welding nozzle 16, eccentrically from the center axis of the welding nozzle 16, toward the groove. As the welding nozzle 16 rotates, an arc produced between the tip of the welding wire 15 and the groove moves on a circle corresponding to the above-mentioned eccentricity of the welding wire 15. The arc and the groove are shielded from the open air by a shielding gas from a shielding gas bottle 23 mounted on the carriage 1. The welding wire 15 and the shielding gas are continuously fed to the welding nozzle 16 through a guide pipe 24 connected between the welding wire feeder 5 and the welding nozzle 16. For the purpose of removing accumulation of dirt and dust in the groove, an air nozzle 25 may be provided, as required, in the downstream of the travelling direction of the welding nozzle 16.

The horizontal profiling mechanism 18 of the groove profiling means 17 is secured to the L-shaped fitting member 3, and comprises a horizontal threaded rod 27 rotatable by a second motor 26, and a horizontal moving member 28 screw-engaging with the horizontal threaded rod 27. The vertical profiling mechanism 19 of the groove profiling means 17 is secured to the horizontal moving member 28 of the above-mentioned horizontal profiling mechanism 18, and comprises a vertical threaded rod 30 rotatable by a third motor 29, and a vertical moving member 31 screw-engaging with the vertical threaded rod 30. The second motor 26 and the third motor 29 are controlled by the welding controller 9 as described hereinbelow. The welding nozzle 16 is secured to the above-mentioned vertical moving member 31.

The welding controller 9 comprises an image processor 32, a welding current controller 33, a welding wire feed controller 34, a welding speed controller 35, and a groove profiling controller 36. The image processor 32 converts an image signal from the groove shooting means 20 into a groove shape signal. The welding current controller 33 controls the welding electric power source 6 in response to the groove shape signal from the image processor 32 so as to maintain the welding current from the welding electric power source 6 at an appropriate value. The welding wire feed controller 34 controls the welding wire feeder 5 in response to the welding current from the welding electric power source 6 so as to maintain the feeding rate of the welding wire 15 at an appropriate value. The welding speed controller 35 controls any one of the rotating speed of the rotating means 8 and the horizontal moving speed of the horizontal column 11 of the manipulator 2 in response to the feeding rate of the welding wire 15 so as to maintain the welding speed at an appropriate value. The groove profiling controller 36 controls the groove profiling means 17 on the basis of the welding current from the welding electric power source 6 so as to cause the center axis of the welding nozzle 16 to run along the center line of the groove and to maintain the distance between the tip of the welding wire 15 and the groove at an appropriate value.

The groove profiling controller 36 is explained in more detail below. The groove profiling controller 36 continuously detects, for each one rotation of the welding nozzle 16, values of variation of the welding current from the welding electric power source 6, for each of the left half cycle and the right half cycle relative to a vertical plane including the center axis of the welding nozzle 16, continuously smoothes, for said each one rotation, the values of variation thus detected of the welding current for said left half cycle and said right half cycle, continuously calculates, for said each one rotation, the difference between the values of variation thus smoothed of the welding current for said left half cycle and said right half cycle, and controls the rotation of the second motor 26 of the horizontal profiling mechanism 18 to controllably move, for said each one rotation, the welding nozzle 16 in the width direction of the groove so that the difference thus calculated becomes zero, whereby the center axis of the welding nozzle 16 is aligned with the center line of the groove for said each one rotation.

Furthermore, the groove profiling controller 36 continuously detects, for each one rotation of the welding nozzle 16, values of variation of the welding current from the welding electric power source 6, continuously smoothes, for said each one rotation, the values of variation thus detected of the welding current, continuously calculates, for said each one rotation, the difference between the values of variation thus smoothed of the welding current and the reference value of the welding current from the welding electric power source 6, and controls the rotation of the third motor 29 of the vertical profiling mechanism 19 to controllably move, for said each one rotation, the welding nozzle 16 in the depth direction of the groove so that the difference thus calculated becomes zero, whereby the distance between the tip of the welding wire 15 and the groove is maintained at an appropriate value for said each one rotation.

Now, a case where a tack-welded cylindrical vessel 7 is welded along an inner surface groove formed in the circumferential direction thereof, using the welding apparatus of the present invention, is described.

First, the cylindrical vessel 7 to be welded is horizontally placed on the rotating means 8. Then, after rotating the expansion arm 12 to the horizontal position as shown by a two-point chain line in FIG. 3, the horizontal column 11 is vertically moved along the vertical post 10 so that the welding head 4 faces the opening 7A provisionally provided on one end of the cylindrical vessel 7. Then, the horizontal column 11 is moved horizontally to be inserted same together with the expansion arm 12 into the cylindrical vessel 7. Subsequently, the expansion arm 12 is rotated to the vertical position as shown by a solid line in FIG. 3. At this point, the welding head 4 is rotated by means of the first motor 14 of the L-shaped fitting member 3 so that the TV camera 21 is positioned above the inner surface groove. By adjusting the length of the expansion arm 12 while watching the monitor of the TV camera 21, the distance between the tip of the welding wire 15 and the inner surface groove is maintained at an appropriate value.

Once the welding head 4 is thus set at a prescribed position in the cylindrical vessel 7 to be welded, the cylindrical vessel 7 is rotated around the center axis thereof by means of the rotating means 8, and the welding current is supplied from the welding electric power source 6 to the welding wire 15 to produce an arc between the tip of the welding wire 15 and the inner surface groove, whereby the tack-welded cylindrical vessel 7 is welded along the inner surface groove. In this case, an image signal from the TV camera 21 is converted by the image processor 32 into a groove shape signal, and the welding electric power source 6 is controlled by the welding current controller 33 in response to the groove shape signal from the image processor 32 so that the welding current is maintained at an appropriate value. At the same time, the wire feeder 5 is controlled by the welding wire feed controller 34 in response to the welding current from the welding electric power source 6 so that the feeding rate of the welding wire 15 is maintained at an appropriate value. Simultaneously, the rotating speed of the rotating means 8 is controlled by the welding speed controller 35 of the welding controller 9 in response to the feeding rate of the welding wire 15 from the welding wire feeder 5 so that the welding speed is maintained at an appropriate value. Furthermore, the groove profiling means 17, which comprises the horizontal profiling mechanism 18 and the vertical profiling mechanism 19, is controlled by the groove profiling controller 36, on the basis of the welding current from the welding electric power source 6, so that the center axis of the welding nozzle 16 runs along the center line of the inner surface groove and the distance between the tip of the welding wire 15 and the inner surface groove is maintained at an appropriate value. The cylindrical vessel 7 is thus automatically welded as described above, under the predetermined welding conditions, along the inner surface groove formed circumferentially thereon.

Now, a case where a tack-welded cylindrical vessel 7 is welded along an inner surface groove formed in the axial direction thereof, using the welding apparatus of the present invention, is described.

The horizontal column 11 of the manipulator 2 is horizontally moved when the cylindrical vessel 7 is welded along the inner surface groove formed in the axial direction thereof, whereas the cylindrical vessel 7 is rotated around the center axis thereof as described above when the cylindrical vessel 7 is welded along the inner surface groove formed in the circumferential direction thereof. More specifically, the cylindrical vessel 7 is not rotated around the center axis thereof, but the horizontal column 11 is horizontally moved instead. In this case, the horizontal moving speed of the horizontal column 11 is controlled by the welding speed controller 35 of the welding controller 9 in response to the feeding rate of the welding wire 15 from the welding wire feeder 5 so that the welding speed is maintained at an appropriate value.

When welding of the cylindrical vessel 7 along the inner surface grooves formed in the circumferential and axial directions thereof is completed, the horizontal column 11 is horizontally withdrawn together with the expansion arm 12 from the cylindrical vessel 7 through the opening 7A after rotating the expansion arm 12 to the horizontal position. The cylindrical vessel 7 is then automatically welded along the outer surface grooves formed in the circumferential and axial directions thereof in a manner similar to that for the above-mentioned welding of the cylindrical vessel 7 along the inner surface grooves formed in the circumferential and axial directions thereof.

According to the welding apparatus of the present invention, as described above in detail, it is possible to automatically weld a tack-welded cylindrical vessel at a high efficiency along an outer surface groove and an inner surface groove formed thereon, thus providing industrially useful effects.

What is claimed is:

1. An apparatus for automatically welding a cylindrical vessel, comprising:

a rotating means (8) for rotating a cylindrical vessel to be welded, placed horizontally thereon, around the center axis of said cylindrical vessel;

a travelling carriage (1);

a manipulator (2) mounted on said carriage (1), said manipulator comprising a post (10) vertically secured onto said carriage (1), a column (11) horizontally fitted to said vertical post (10), said horizontal column being horizontally movable relative to said vertical post (10) and vertically movable along said vertical post (10), and an expansion arm (12) fitted rotatably within a vertical plane to the leading end of said horizontal column (11);

an L-shaped fitting member (3) fitted rotatably around the center axis of said expansion arm (12) to the tip of said arm (12);

a welding head (4) fitted to said L-shaped fitting member (3), said welding head comprising a welding nozzle (16), the center axis of which runs along the extension of the center axis of said expansion arm (12), for guiding a welding wire (15) toward a groove formed on said cylindrical vessel to be welded, a groove profiling means (17) which comprises a horizontal profiling mechanism (18) for moving said welding nozzle (16) in the width direction of said groove and a vertical profiling mechanism (19) for moving said welding nozzle (16) in the depth direction of said groove, and a groove shooting means (20) which comprises a TV camera (21) for shooting a portion of said groove in the downstream of the travelling direction of said welding nozzle (16) and a light source (22) for illuminating said portion of said groove to be shot by said TV camera (21), whereby said welding head (4) is rotatable around the center axis of said welding nozzle (16) along with rotation of said L-shaped fitting member (3);

a welding wire feeder (5), mounted on said carriage (1), for continuously feeding said welding wire (15) through said welding nozzle (16) toward said grove;

a welding electric power source (6), mounted on said carriage (1), for supplying a welding current to said welding wire (15) to produce an arc between the tip of said welding wire (15) and said groove; and a welding controller (9) mounted on said carriage (1), said welding controller comprising an image processor (32) for converting an image signal from said groove shooting means (20) into a groove shape signal, a welding current controller (33) for controlling said welding electric power source (6) in response to said groove shape signal from said image processor (32) so as to maintain said welding current at an appropriate value, a welding wire feed controller (34) for controlling said welding wire feeder (5) in response to said welding current from said welding electric power source (6) so as to maintain the feeding rate of said welding wire (15) at an appropriate value, a welding speed controller (35) for controlling any one of the rotating speed of said rotating means (8) and the horizontal moving speed of said horizontal column (11) in response to the feeding rate of said welding wire (15) so as to maintain the welding speed at an appropriate value, and a groove profiling controller (36) for controlling said groove profiling means (17) on the basis of said welding current from said welding electric power source (6) so as to cause the center axis of said welding nozzle (16) to run along the center line of said groove and to maintain the distance between the tip of said welding wire (15) and said groove at an appropriate value.

* * * * *